Oct. 11, 1932.  J. J. J. GÖRANSSON ET AL  1,882,493
LAMP FOR MOTOR CARS
Filed Sept. 6, 1930  3 Sheets-Sheet 1
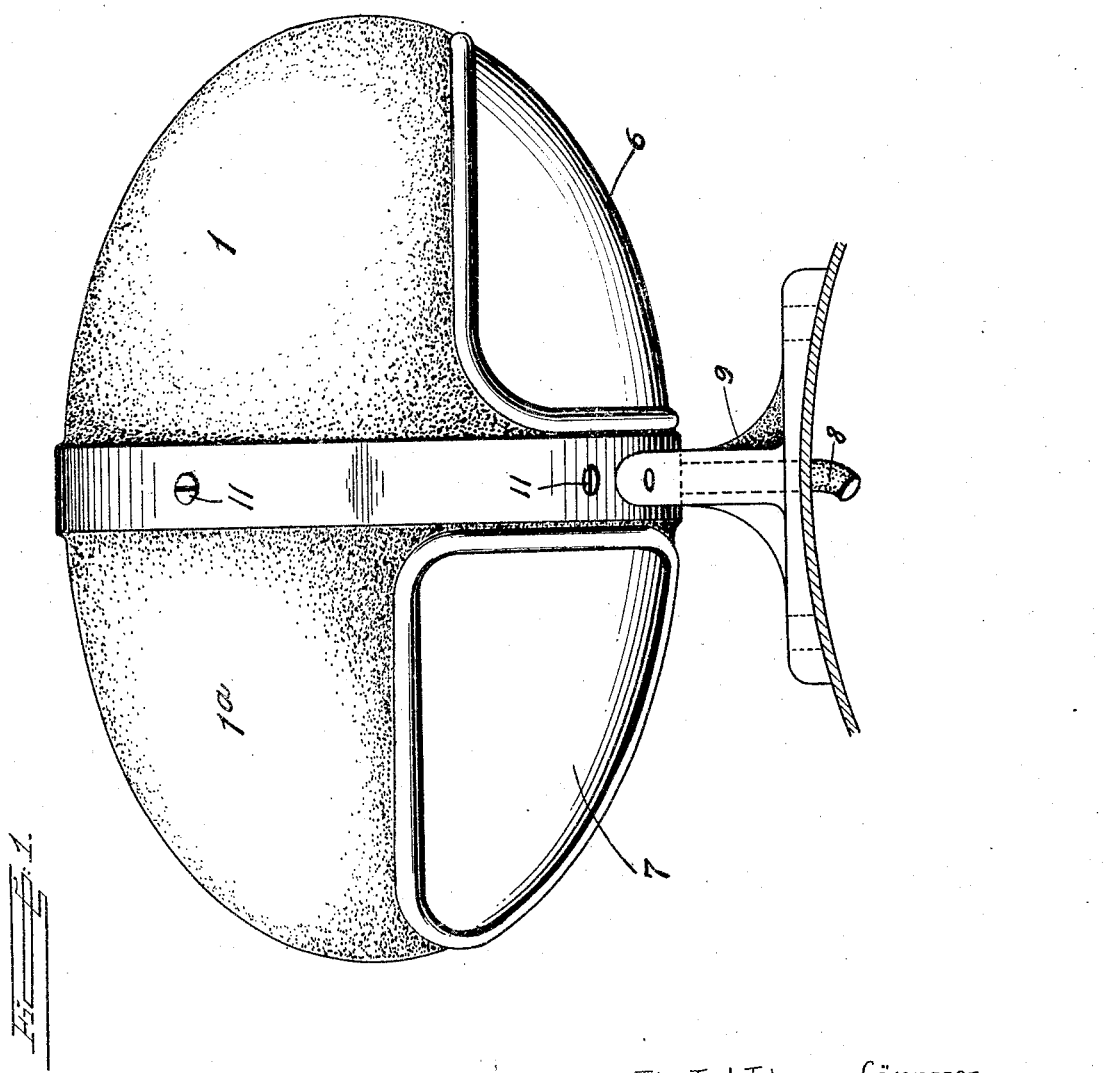
John Joel Johannes Göransson
Axel Theoder Koch
INVENTORS

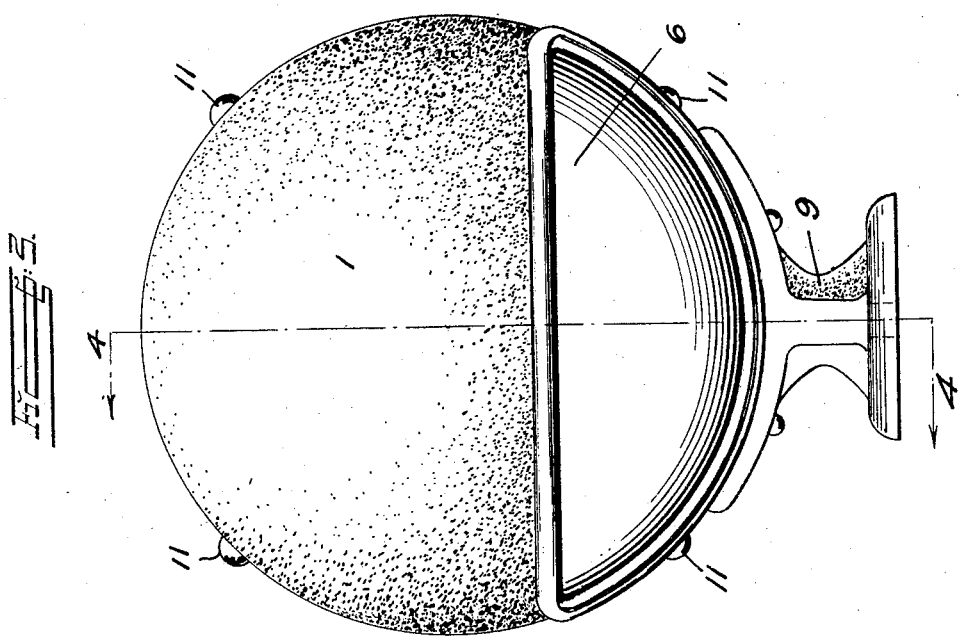
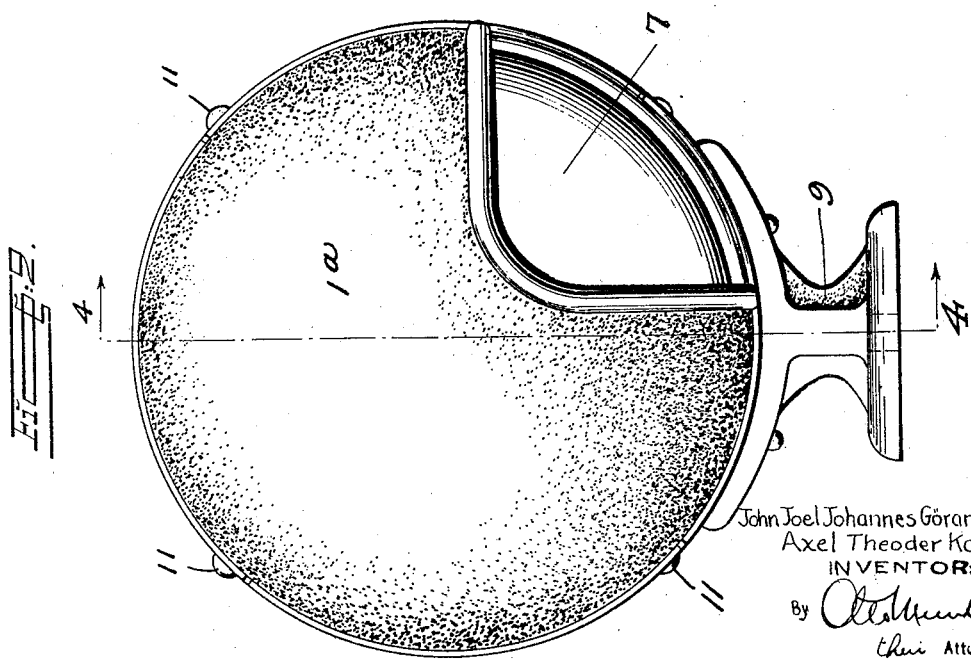

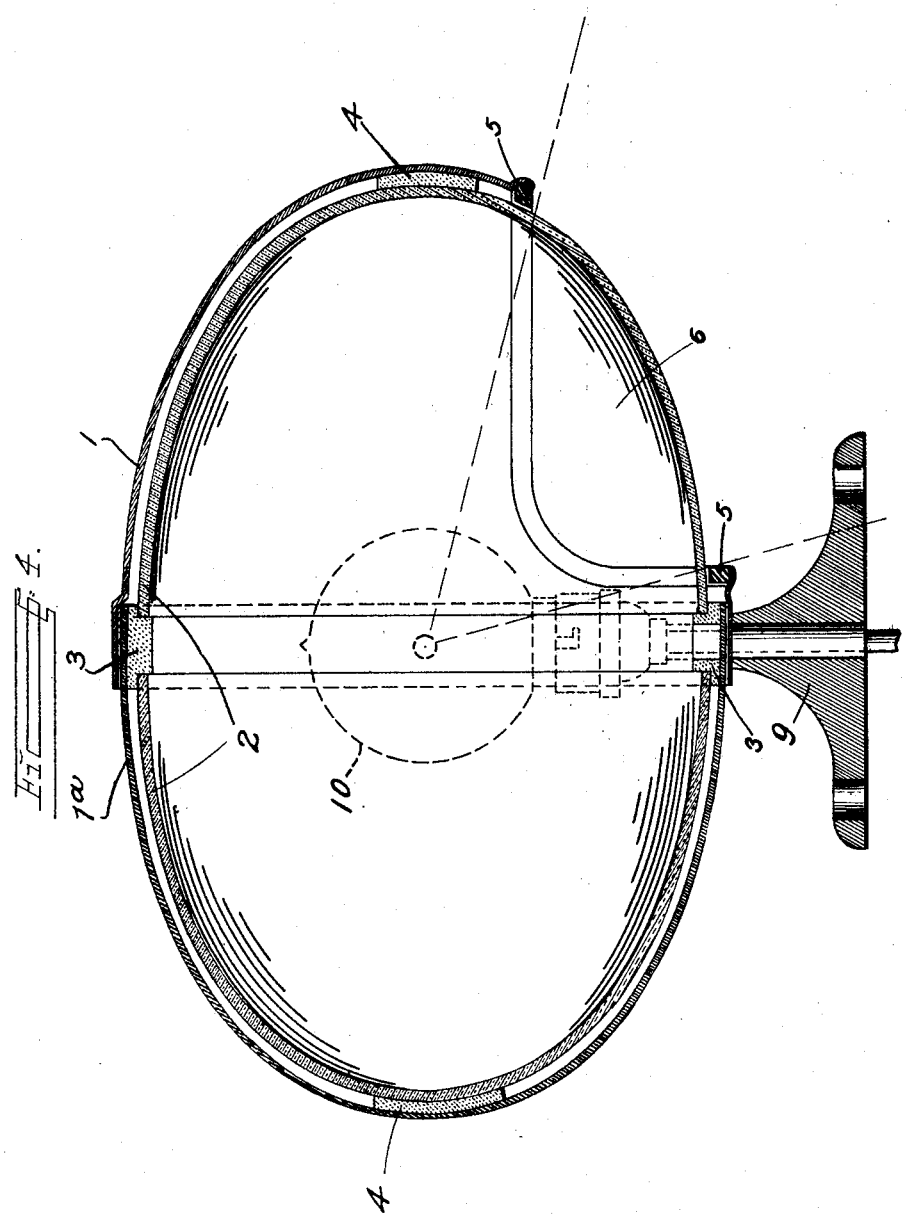

Patented Oct. 11, 1932

1,882,493

UNITED STATES PATENT OFFICE

JOHN JOEL JOHANNES GÖRANSSON, OF LINKOPING, AND AXEL THEODOR KOCH, OF MOTALA, SWEDEN

LAMP FOR MOTOR CARS

Application filed September 6, 1930, Serial No. 480,162, and in Sweden February 26, 1929.

This invention relates to a head lamp for motor cars which throws its light forwardly, downwardly and rearwardly so that the sides and the front portion of the car are illuminated in such a way that persons in an approaching car are not blinded by the glare.

The lamp of the present invention has for its object to provide particularly advantageous construction, namely, a casing consisting of two halves, the front half thereof being provided with an opening transmitting the light forwardly and downwardly and being further fixedly mounted at an adjustable foot attached to the car, while the rear half of the casing is removably mounted at the front half and is provided with an opening through which the light is thrown backwardly, downwardly and laterally.

Further, the holes for the connecting screws of the front and back halves of the casing are, according to the present invention, disposed relative to each other so that the two halves may be connected to each other in two positions disposed at right angles to each other. This has for its advantage that the lamp may be located at the left side of the car for right-hand traffic as well as at the right side of the car for left-hand traffic. Further, two glass-shades are located within the casing of the lamp, which are provided with a reflecting layer omitting only the surfaces in front of the openings, thus increasing the clearness of the rays. Further, the mounting for the glass-shades is made in such a way that the shades, through intermediate layers and packings respectively, are yieldably supported in a water-tight construction in the casing. The intermediate layers are arranged peripherally of the shades both in the vertical and horizontal axes and are carried along the edges of the light outlet openings respectively. Thus, a non-splintering and a tightening mounting of the glass-shades is obtained.

An embodiment of the invention is shown in the accompanying drawings, in which

Figure 1 is a side elevational view of the lamp.

Figure 2 is a rear elevational view thereof,

Figure 3 is a front elevational view of the same, and

Figure 4 is a substantially longitudinal sectional view taken on lines 4—4 of Figures 2 and 3.

The lamp is mounted on the front fender of the car with a bored foot 9 or pedestal through which an electric cable is introduced.

The lamp consists of an egg shaped outer casing divided transversely into halves 1, 1a. The front half 1 of the casing is mounted on the foot 9 and at the under side is provided with a window 6. The rear half 1a of the casing is fixed to the front half 1 by means of screws 11 and is provided with a lateral window 7.

Within the casing 1 and 1a two glass-shades 2 are disposed. The glass-shades 2 are, except for the surfaces lying in front of the window openings of the casing, provided with an inwardly reflecting layer. The glass-shades are held in a certain position within the casing first by means of a packing 3 of india rubber placed circumferentially of the mid-portion, second by disks 4 of india rubber located at the ends, and finally by india rubber packings 5 disposed in grooves in the casing defining the window openings 6, 7. Thus the lamp is closed in a completely water-tight manner and the glass-shades are yieldably held in their respective places.

The lamp accommodates in its centre portion an electric light bulb 10. In order to obtain the most suitable distribution of the light in the various cases the bulb is adjustably located in the casing.

The lamp is operated in the following manner:

Through the front window 6 the roadway in front of the car is illuminated along a triangular surface, the point of which will lie 20–30 metres ahead of the car and the base-line of which will lie immediately at the front portion of the car. Laterally the illuminated roadway surface extends along the base-line to the sides of the road, the front outlines of the fenders, the cooler and the number plate being also illuminated.

Through the window 7, the roadway at the meeting side of the car and the side of the car itself are illuminated, particularly the fenders and the step, i. e. those parts which must be most conspicuous in order to ensure a safe passing.

And furthermore by means of a suitable adjustment of the light source within the lamp, no direct rays will be directed towards approaching cars or into the cars to be overtaken, as a result of which all glare is avoided.

If also the approaching car is provided with such a lamp a meeting in the dark may take place as safely as in the day. This is a most important fact for traffic safety.

The fixing screws 11 connecting the halves 1, 1a of the casing are disposed in such a way that the lamp, without further provision, may be used also at the left side of the car in countries having left-hand traffic. The rear half 1a of the casing need only be turned 90°. The screws should therefore be uniformly distributed at the periphery and arranged at the same distance relative to each other corresponding to the turning angle.

The lamp may be provided with a foot allowing an adjustment in various positions, the windows may also be provided with shades and the like for the purpose of shutting off the light in different ways.

Having now described our invention, what we claim as new and desire to secure by Letters Patent is:

1. A lamp for motor cars comprising a light source, a reflector and a stream line formed casing surrounding the light source, the casing being divided transversely into front and rear halves, the front half being provided with an opening taking in the under portion from side to side and through which the light projects forwardly and downwardly in front of the car, said rear half having an opening taking in one-half the under portion from the bottom to one side and through which the light is transmitted rearwardly, downwardly and laterally.

2. A lamp as claimed in claim 1, including two glass-shades conforming to and disposed within the casings, said glass-shades having reflecting areas throughout their surfaces except in the portions before the openings.

In witness whereof we have hereunto signed our names.

JOHN JOEL JOHANNES GÖRANSSON.
AXEL THEODOR KOCH.